United States Patent Office 2,861,998
Patented Nov. 25, 1958

2,861,998

HETEROCYCLIC NITROGEN COMPOUND POLYMER INHIBITORS

William B. Reynolds and Robert E. Reusser, Bartlesville, Okla., assignors to Phillips Petroleum Company, a corporation of Delaware No Drawing. Application December 27, 1955
Serial No. 555,230

14 Claims. (Cl. 260—290)

This invention relates to a process for inhibiting polymerization of polymerizable heterocyclic compounds containing a hetero nitrogen atom. In one of its aspects, this invention relates to the inhibiting of polymerization of alkenyl-substituted heterocyclic nitrogen-containing compounds. In still another aspect, this invention relates to the inhibiting of the formation of polymer in vinylpyridine compounds.

The words inhibit and stabilize as used in this specification and the attached claims are used to mean that the formation of polymer is materially reduced or prevented, and do not imply any mechanism for accomplishing this purpose.

Alkenyl-substituted heterocyclic nitrogen-containing compounds are frequently produced by dehydrogenation of the corresponding alkyl-substituted compound. The dehydrogenation is not complete and the resulting mixture is separated into its component parts, chiefly alkyl and alkenyl-substituted nitrogen-containing heterocyclic ring compounds, by suitable means such as distillation. However, the tendency of the alkenyl-substituted compounds to polymerize is a major difficulty encountered in the manufacture and storage of these compounds. As this tendency is enhanced by elevated temperature, the separation of the alkenyl-substituted compound from other constituents by distillation is extremely difficult due to the formation of polymer within the distillation column and auxiliary equipment.

In the processing of alkenyl-substituted heterocyclic nitrogen-containing compounds, polymerization occurs which manifests itself in two ways. Soluble polymers are formed which are evidenced by an increase in viscosity, and ultimately, by forming a solid mass. Also formed are insoluble polymers or proliferous polymers referred to in the trade, and herein, as popcorn polymers. The popcorn polymer is insoluble in the heterocyclic nitrogen compound and in other organic compounds, and when in contact with a monomer, it continues to grow. This problem is particularly acute in the manufacture, processing and storing of vinyl-substituted pyridines obtained by the dehydrogenation of the corresponding ethyl-substituted pyridines.

Of the various methods used to solve this polymer problem, the addition of a stabilizing agent or a polymerization inhibitor is the most effective method on the over-all basis. However, polymerization inhibitors which have been used for such monomers as styrene are frequently not effective as inhibitors for the polymerization of vinyl-substituted heterocyclic nitrogen compounds. Furthermore, care must be taken to select a compound for use as a polymerization inhibitor which will inhibit polymerization during processing and storage, but which may be readily removed from the stabilized monomer when desired.

Another difficulty encountered in stabilizing alkenyl-substituted heterocyclic nitrogen-containing compounds is that the inhibitor which is effective in preventing the formation of soluble polymer is frequently only partially effective in preventing the formation of popcorn polymer, or the reverse can be true. Also, an inhibitor at one temperature is not necessarily useful at another temperature.

An object of this invention is to provide a method of stabilizing alkenyl-substituted heterocyclic nitrogen-containing compounds against polymerization.

Another object of this invention is to provide an alkenyl-substituted heterocyclic nitrogen-containing compound stabilized against polymerization.

Still another object of this invention is to provide a novel polymerization inhibitor effective against both soluble and popcorn polymer formation in alkenyl-substituted heterocyclic nitrogen-containing compounds.

Still another object of this invention is to provide a polymerization inhibitor especially useful in a distillation column wherein alkenyl-substituted heterocyclic nitrogen-containing monomers are being separated from other compounds.

Still other objects and advantages of this invention will be apparent to those skilled in the art having been given this disclosure.

It is now discovered that the nitro-substituted aminophenols and nitro-substituted amino alkali metal phenoxides of the following general formula are effective in inhibiting polymerization of certain heterocyclic nitrogen compounds at ambient temperature and at conditions of elevated temperature, i. e. process and storage conditions;

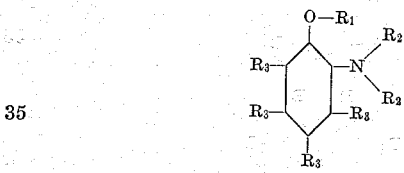

wherein $R_1$ is selected from the group consisting of hydrogen and the alkali metals, each $R_2$ is selected from the group consisting of hydrogen and alkyl groups of 1 to 4 carbon atoms, and each $R_3$ is selected from the group consisting of $NO_2$, hydrogen and alkyl groups of 1 to 4 carbon atoms and at least one $R_3$ is $NO_2$. The alkali metals are known in the art and include sodium, potassium, lithium, rubidium, and cesium.

Some examples of compounds of the above general formula which are effective polymerization inhibitors when used according to this invention include 4-nitro-2-aminophenol, 3-nitro-5-butyl - 2 - aminophenol, 3 - nitro-4,5,6-trimethyl-2-aminophenol, 3-nitro-2-(N,N-dimethyl)-aminophenol, 5-nitro-3,4,6-triisobutyl - 2 - (N,N-diethyl)-aminophenol, 4,6-dinitro-2 - (N - methyl - N - n - propyl) aminophenol, 4,6-dinitro-3,5-dimethyl-2-(N-ethyl-N - isopropyl)aminophenol, 3,5,6-trinitro-2-(N,N-di-tert-butyl)-aminophenol, 3,4,5,6-tetranitro-2-aminophenol, 3-nitro-2-(N,N-dimethyl)aminophenol (sodium salt), 4-nitro-2-aminophenol (sodium salt), 4-nitro-2-aminophenol (potassium salt), 5-nitro-2-(N,N-diethyl)aminophenol (potassium salt), 4,6-dinitro-2-(N-methyl - N - n - propyl)-aminophenol (lithium salt), 4-nitro-2-aminophenol (rubidium salt), 5 - nitro - 2 - (N,N - dibutyl)aminophenol (cesium salt).

According to this invention, certain polymerizable heterocyclic nitrogen-containing compounds are stabilized against polymerization by the addition of nitro substituted aminophenols of the above described general formula.

In general, the amount of inhibitor used will be in the range of 0.01 weight percent to 5 weight percent based on the polymerizable compounds with an amount in the range of 0.05 to 2 weight percent being more frequently used and preferably 0.1 to 1 percent will be used. It will be understood by those skilled in the art that lesser amounts can be used but may not provide adequate protection while greater amounts are not ordinarily required.

Both the soluble and popcorn polymer formation are inhibited by the compounds of this invention. These inhibitors are particularly useful in distillation processes since the material is effective both in the pot and in the column, however, these inhibitors are also effective as storage inhibitors.

The polymerizable heterocyclic nitrogen bases which are inhibited by the inhibitors of this invention are those of the pyridine, quinoline and isoquinoline series and which contain at least one

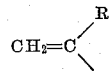

substituent wherein R is either hydrogen or a methyl group. That is, the substituent is either vinyl or an alpha-methylvinyl (isopropenyl) group. Of these compounds the pyridine derivatives are of the greatest interest commercially at present. Various substituted derivatives are also applicable but the total number of carbon atoms in the nuclear substituted groups, such as alkyl groups, should not be greater than 12 because the polymerization rate decreases somewhat with increasing size of the alkyl group. Compounds where the alkyl substituents are methyl and/or ethyl are available commercially.

These heterocyclic nitrogen bases have the formula

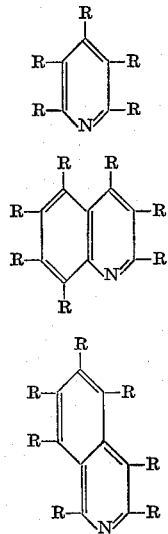

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyridine; 2-vinyl-5-ethylpyridine; 2-methyl-5-vinylpyridine; 4-vinylpyridine; 5-vinylpyridine; 3-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl - 3 - vinylpyridine; 2,4-dimethyl-5,6-dipentyl-3-vinylpyridine; 2-decyl-5-(alpha-methylvinyl)pyridine; 2-vinyl-3-methyl - 5 - ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4 - phenoxy-5-methylpyridine; 2-cyano - 5 - (alpha-methylvinyl)-pyridine; 3-vinyl - 5 - phenylpyridine; 2 - (para - methylphenyl)-3-vinyl-4-methylpyridine; 3 - vinyl - 5 - (hydroxyphenyl)pyridine; 2-vinylquinoline; 2-vinyl-4-ethylquinoline; 3-vinyl-6,7-di-n-propyl-quinoline; 2-methyl-4-nonyl-6-vinylpyridine; 4(alpha-methylvinyl) - 8 - dodecyl-quinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2 - vinyl - 6 - ethoxy - 7-methylquinoline; 3-vinyl - 6 - hydroxymethylisoquinoline; and the like.

When the inhibitors of this invention are used as inhibitors during the separation of vinyl-substituted heterocyclic nitrogen compound from saturated heterocyclic nitrogen compounds; such as for example, the distillation of 2-methyl-5-vinylpyridine from 2-methyl-5-ethylpyridine, the inhibitor can be added to the feed at the distillation column or addition can be made at any point along the column or the inhibitors can be added at either the top of the column, the bottom of the column or in the column reflux.

The heterocyclic compound containing a hetero nitrogen atom of particular commercial importance is 2-methyl-5-vinylpyridine (MVP). For that reason, we will illustrate how our invention is useful in inhibiting polymer formation using 2-methyl-5-vinylpyridine and nitro substituted aminophenols. It will be understood by those skilled in the art that the heterocyclic nitrogen containing compounds as disclosed can be similarly inhibited against polymerization by the other nitroaminophenols disclosed and are effective in the presence or absence of water, air, metals, etc.

EXAMPLE I 4-nitro-2-aminophenol was tested as an inhibitor toward soluble polymer formation in 2-methyl-5-vinylpyridine (MVP) by the following procedure.

Samples of MVP containing 5 weight percent water were placed in vials and to each vial was added a small piece of steel and the inhibitor to be tested. The vials were then flushed with nitrogen and sealed tightly with screw-on tops. The vials were then placed in an oven and maintained at 185° F. for 16 hours, after which a weighed sample of the contents of each vial was evaporated under vacuum and over boiling water. The residue which remained, with allowance for the weight of inhibitor present, was considered to be soluble polymer. The results of these tests are expressed below as Table I. Data for ortho-aminophenol, a known polymerization inhibitor for vinylpyridines, are included here for comparison.

Table I

| Inhibitor | Amount of Inhibitor Used, Wt. Percent Based on MVP | Amount of Soluble Polymer Formed (Weight percent) (Avg. of two runs) |
|---|---|---|
| 4-nitro-2-aminophenol | 0.1 | 1.88 |
|  | 0.3 | 0.77 |
|  | 0.6 | 0.72 |
| 2-aminophenol | 0.1 | 12.43 |
|  | 0.3 | 5.63 |
|  | 0.6 | 2.76 |
| Control | (No Inhibitor) | 25.00 |

EXAMPLE II

Further tests were run to determine the effectiveness of the compounds of this invention as polymerization inhibitors for 2-methyl-5-vinylpyridine under conditions of storage and/or transit.

In these tests, the vials, each containing a small piece of steel, were charged with MVP to which had been added 0.1 weight percent of the inhibitor to be tested. Thirty-five percent of the volume of each vial was left empty to provide an air cover for each sample and to thereby simulate conditions of storage and transit. The vials were sealed with tin foil caps and sealing wax and were maintained at 100° F. during the test period. The results of these tests are expressed below as Table II. The amount of soluble polymer formed in these runs was determined by the hexane precipitation method, a method in which the total sample is added to n-hexane and the polymer which precipitates is filtered, dried and weighed.

*Table II*

| Inhibitor | Type of MVP | Test Period, Days | Amount of Soluble Polymer Formed (Weight Percent) |
|---|---|---|---|
| 4-nitro-2-aminophenol | Flashed | 21 | 0.00 |
| Do | Commercial | 21 | 0.00 |
| 2-aminophenol | do | 21 | 1.95 |
| Control (No Inhibitor) | do | 21 | 10.59 |

EXAMPLE III

A group of tests were made using 2-amino-4-nitrophenol to determine its effectiveness as an inhibitor toward the formation of insoluble or "popcorn" polymer in MVP. Samples of the MVP were prepared which contained 5 weight percent water and a small piece of steel. These samples were placed in vials and to each sample was added 0.3 weight percent divinylbenzene and the stated amount of the inhibitor which was being tested. The inhibitor was added to the sample, after the sample had been allowed to stand for about five hours at 185° F. This 5-hour period of incubation produced a small seed of popcorn polymer, after which the inhibitors were added. The vials in these runs were filled to a level such that an air cover amounting to 35 percent of the total volume of the vial was empty. These vials were then placed in an oven maintained at 185° F. and the results observed after varying lengths of time. The results of these tests are expressed below as Table III.

*Table III*

| Inhibitor | Amount of Inhibitor Used, Percent by Weight Based on MVP | Results |
|---|---|---|
| 2-aminophenol | 0.1 | No growth in 45 days. |
| 4-nitro-2-aminophenol | 0.1 | No growth in 20 days—test discontinued. |
| Control | None | 100% popcorn polymer in 8 hrs. |

We claim:

1. A method of stabilizing a polymerizable heterocyclic nitrogen compound having the formula

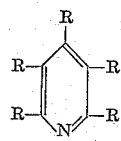

wherein R is selected from the group consisting of hydrogen, alkyl, vinyl, and isopropenyl (alpha-methylvinyl) groups, one of said groups being selected from the group consisting of vinyl and isopropenyl groups, the total number of carbon atoms in the alkyl groups being not greater than 12, said method comprising incorporating with said compound a stabilizing amount of a compound selected from the group consisting of 4-nitro-2-aminophenol
3-nitro-5-butyl-2-aminophenol
3-nitro-4,5,6-trimethyl-2-aminophenol
3-nitro-2-(N,N-dimethyl)aminophenol
5-nitro-3,4,6-triisobutyl-2-(N,N-diethyl)aminophenol
4,6-dinitro-2-(N-methyl-N-n-propyl)aminophenol
4,6-dinitro-3,5-dimethyl-2-(N-ethyl-N-isopropyl)-aminophenol
3,5,6-trinitro-2-(N,N-di-tert-butyl)aminophenol
3,4,5,6-tetranitro-2-aminophenol
3-nitro-2-(N,N-dimethyl)aminophenol (sodium salt)
4-nitro-2-aminophenol (sodium salt)
4-nitro-2-aminophenol (potassium salt)
5-nitro-2-(N,N-diethyl)aminophenol (potassium salt)
4,6-dinitro-2-(N-methyl-N-n-propyl)aminophenol (lithium salt)
4-nitro-2-aminophenol (rubidium salt) and
5-nitro-2-(N,N-dibutyl)aminophenol (cesium salt)

2. The method of claim 1 wherein the stabilizing compound is incorporated in an amount in the range of 0.01 to 5 weight percent based on the polymerizable heterocyclic compound.

3. A method of recovering polymerizable heterocyclic nitrogen compound from liquid admixture of such compound with other organic compounds, said heterocyclic nitrogen compound having the formula

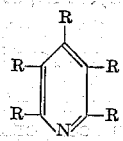

wherein R is selected from the group consisting of hydrogen, alkyl, vinyl, and isopropenyl (alpha-methylvinyl) groups, one of said groups being selected from the group consisting of vinyl and isopropenyl groups, the total number of carbon atoms in the alkyl groups being not greater than 12, said method comprising dissolving a stabilizing amount of a stabilizing compound in said admixture and separating the polymerizable compound from the organic admixture by fractional distillation, said stabilizing compound being selected from the group consisting of 4-nitro-2-aminophenol
3-nitro-5-butyl-2-aminophenol
3-nitro-4,5,6-trimethyl-2-aminophenol
3-nitro-2-(N,N-dimethyl)aminophenol
5-nitro-3,4,6-triisobutyl-2-(N,N-diethyl)aminophenol
4,6-dinitro-2-(N-methyl-N-n-propyl)aminophenol
4,6-dinitro-3,5-dimethyl-2-(N-ethyl-N-isopropyl)-aminophenol
3,5,6-trinitro-2-(N,N-di-tert-butyl)aminophenol
3,4,5,6-tetranitro-2-aminophenol
3-nitro-2-(N,N-dimethyl)aminophenol (sodium salt)
4-nitro-2-aminophenol (sodium salt)
4-nitro-2-aminophenol (potassium salt)
5-nitro-2-(N,N-diethyl)aminophenol (potassium salt)
4,6-dinitro-2-(N-methyl-N-n-propyl)aminophenol (lithium salt)
4-nitro-2-aminophenol (rubidium salt) and
5-nitro-2-(N,N-dibutyl)aminophenol (cesium salt)

4. A process for inhibiting polymer formation in a fractionation zone in which a mixture of heterocyclic nitrogen compounds containing a polymerizable heterocyclic compound selected from the group consisting of compounds having the formula

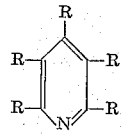

wherein R is selected from the group consisting of hydrogen, alkyl, vinyl, and isopropenyl (alpha-methylvinyl) groups, one of said groups being selected from the group consisting of vinyl and isopropenyl groups, the total number of carbon atoms in the alkyl groups being not greater than 12 is being fractionated, said process comprising effecting the fractionation in the presence of 0.01 to 5 weight percent based on the weight of the polymerizable heterocyclic compound of a stabilizing compound selected from the group consisting of 4-nitro-2-aminophenol 3-nitro-5-butyl-2-aminophenol
3-nitro-4,5,6-trimethyl-2-aminophenol
3-nitro-2-(N,N-dimethyl)aminophenol
5-nitro-3,4,6-triisobutyl-2-(N,N-diethyl)aminophenol
4,6-dinitro-2-(N-methyl-N-n-propyl)aminophenol
4,6-dinitro-3,5-dimethyl-2-(N-ethyl-N-isopropyl)-aminophenol
3,5,6-trinitro-2-(N,N-di-tert-butyl)aminophenol
3,4,5,6-tetranitro-2-aminophenol
3-nitro-2-(N,N-dimethyl)aminophenol (sodium salt)
4-nitro-2-aminophenol (sodium salt)
4-nitro-2-aminophenol (potassium salt)
5-nitro-2-(N,N-diethyl)aminophenol (potassium salt)
4,6-dinitro-2-(N-methyl-N-n-propyl)aminophenol (lithium salt)
4-nitro-2-aminophenol (rubidium salt) and
5-nitro-2-(N,N-dibutyl)aminophenol (cesium salt)

5. The process of claim 4 wherein the polymerizable heterocyclic nitrogen compound is a 2-methyl-5-vinylpyridine.

6. The process of claim 2 wherein the polymerizable heterocyclic nitrogen compound is 2-methyl-5-vinylpyridine.

7. The process of claim 6 wherein the stabilizing compound is 4-nitro-2-aminophenol.

8. The process of claim 6 wherein the stabilizing compound is 3-nitro-5-butyl-2-aminophenol.

9. The process of claim 6 wherein the stabilizing compound is 3-nitro-2-(N,N-dimethylamino)phenol.

10. The process of claim 6 wherein the stabilizing compound is sodium salt of 4-nitro-2-aminophenol.

11. The process of claim 6 wherein the stabilizing amount is potassium salt of 4-nitro-2-aminophenol.

12. A heterocyclic nitrogen compound selected from the group consisting of compounds having the formula

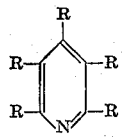

wherein R is selected from the group consisting of hydrogen, alkyl, vinyl, and isopropenyl (alpha-methylvinyl) groups, one of said groups being selected from the group consisting of vinyl and isopropenyl groups, the total number of carbon atoms in the alkyl groups being not greater than 12, said heterocyclic compound being stabilized against polymerization by the presence of a stabilizing compound selected from the group consisting of 4-nitro-2-aminophenol
3-nitro-5-butyl-2-aminophenol
3-nitro-4,5,6-trimethyl-2-aminophenol
3-nitro-2-(N,N-dimethyl)aminophenol
5-nitro-3,4,6-triisobutyl-2-(N,N-diethyl)aminophenol
4,6-dinitro-2-(N-methyl-N-n-propyl)aminophenol
4,6-dinitro-3,5-dimethyl-2-(N-ethyl-N-isopropyl)-aminophenol
3,5,6-trinitro-2-(N,N-di-tert-butyl)aminophenol
3,4,5,6-tetranitro-2-aminophenol
3-nitro-2-(N,N-dimethyl)aminophenol (sodium salt)
4-nitro-2-aminophenol (sodium salt)
4-nitro-2-aminophenol (potassium salt)
5-nitro-2-(N,N-diethyl)aminophenol (potassium salt)
4,6-dinitro-2-(N-methyl-N-n-propyl)aminophenol (lithium salt)
4-nitro-2-aminophenol (rubidium salt) and
5-nitro-2-(N,N-dibutyl)aminophenol (cesium salt)

13. The composition of claim 12 wherein the stabilizing compound is present in the range of 0.01 to 5 weight percent based on the weight of the said heterocyclic compound.

14. The composition of claim 13 wherein the heterocyclic nitrogen compound is 2-methyl-5-vinylpyridine and the stabilizing compound is 4-nitro-2-aminophenol.

References Cited in the file of this patent

UNITED STATES PATENTS

| | | |
|---|---|---|
| 2,556,845 | Kauffman | June 12, 1951 |
| 2,592,625 | Wagner | Apr. 15, 1952 |

OTHER REFERENCES

Foord: Chem. Abs., pages 2235–6, vol. 34 (1940).
Foord: Chemical Society Journal, January–June 1940, pages 48–56.